US012704968B2

(12) United States Patent
Muramoto

(10) Patent No.: US 12,704,968 B2
(45) Date of Patent: Aug. 11, 2026

(54) MEMORY SYSTEM

(71) Applicant: Kioxia Corporation, Tokyo (JP)

(72) Inventor: Takashi Muramoto, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 19/067,244

(22) Filed: Feb. 28, 2025

(65) Prior Publication Data

US 2026/0079628 A1 Mar. 19, 2026

(30) Foreign Application Priority Data

Sep. 19, 2024 (JP) ................................ 2024-162483

(51) Int. Cl.
*G06F 3/06* (2006.01)

(52) U.S. Cl.
CPC .......... *G06F 3/0616* (2013.01); *G06F 3/0634* (2013.01); *G06F 3/0659* (2013.01); *G06F 3/0679* (2013.01)

(58) Field of Classification Search
CPC .... G06F 3/0616; G06F 3/0634; G06F 3/0659; G06F 3/0679
USPC .......................................................... 711/154
See application file for complete search history.

(56) References Cited

U.S. PATENT DOCUMENTS

2009/0046509 A1 2/2009 Annavajhala et al.
2011/0271043 A1* 11/2011 Segal .................. G06F 12/0246 711/E12.001
2016/0041760 A1* 2/2016 Kuang ............... G11C 16/3495 711/103
2019/0095116 A1* 3/2019 Igahara ................. G06F 3/0634
2021/0064249 A1* 3/2021 Mehta ................. G06F 11/1048
2023/0367507 A1 11/2023 Rathore et al.
2025/0085890 A1* 3/2025 Tumanova ............ G06F 3/0679

* cited by examiner

*Primary Examiner* — Arpan P. Savla
*Assistant Examiner* — Sidney Li
(74) *Attorney, Agent, or Firm* — Kim & Stewart LLP

(57) ABSTRACT

A memory system comprises a nonvolatile memory including a plurality of blocks, and a memory controller. The memory controller is configured to track a wear-out degree of each block, and perform a write operation on a certain block in a first write mode of writing a first number of bit per memory cell. The memory controller is configured to, determine, when the wear-out degree of the certain block exceeds a first threshold, whether the nonvolatile memory has a first predetermined size of free space corresponding to the first write mode, and when determining so, invalidate address mapping for a first part of a logical address range and switch a write mode for the certain block from the first write mode to a second write mode of writing a second number of bit per memory cell. The second number is less than the first number.

20 Claims, 8 Drawing Sheets

1
INFORMATION PROCESSING SYSTEM
2
MEMORY SYSTEM
CONTROLLER
3
HOST DEVICE
ANALOG
51
21
42
43
22
44
45
12
11
11
23
CPU
ROM
RAM
REGISTER
CONTROL SIGNAL
R/Bn
RESET
REF_CLK
41
CONTROL BUS
MEMORY
DOUT
DOUT_c
I/O
33
DATA BUS
I/O
DQ
DIN
DIN_c
34
HOST I/F
BUFFER
BUFFER
MEMORY I/F
ECC
31
32
35
36

Figure 2:
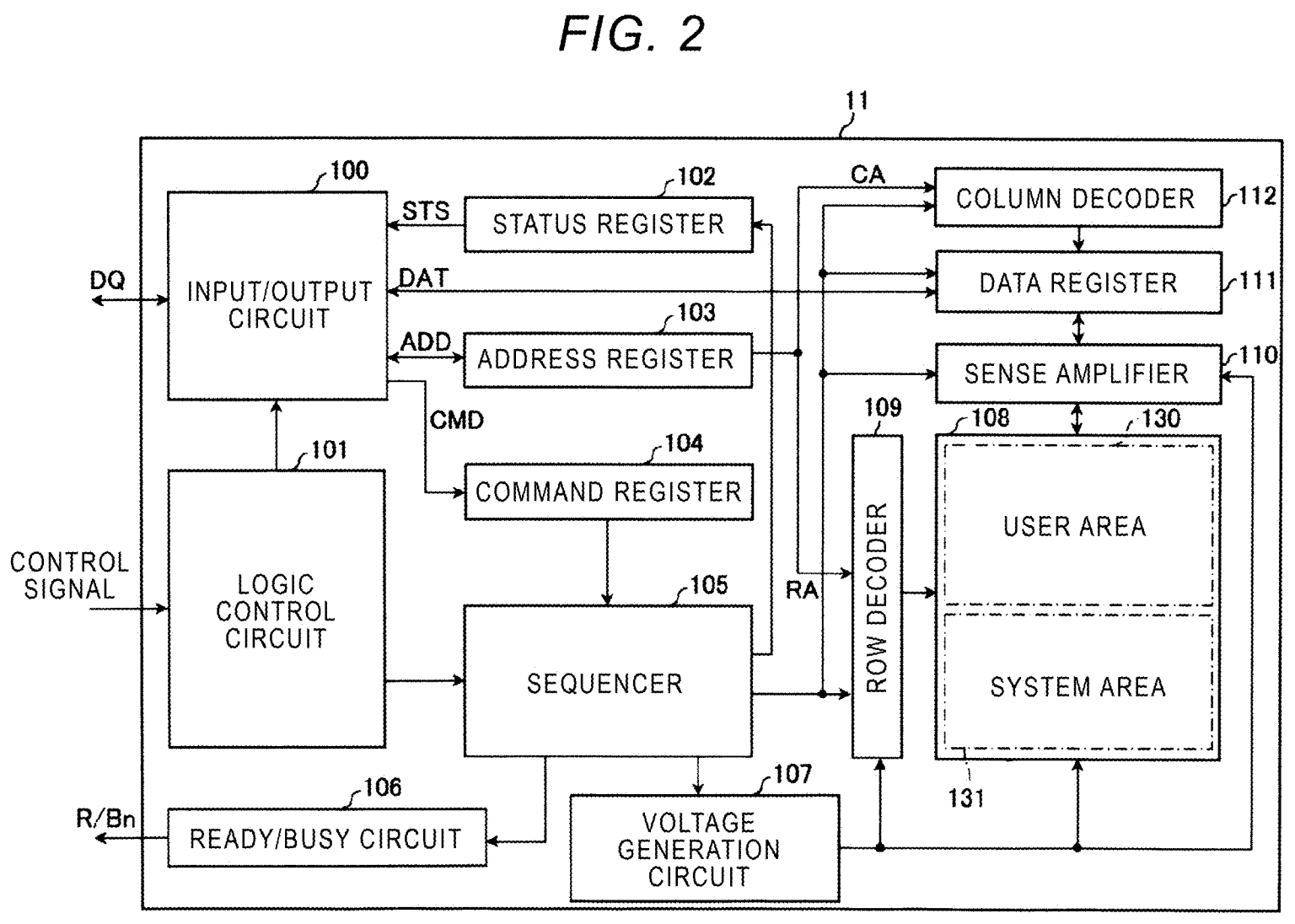

100 INPUT/OUTPUT CIRCUIT
101 LOGIC CONTROL CIRCUIT
102 STATUS REGISTER
103 ADDRESS REGISTER
104 COMMAND REGISTER
105 SEQUENCER
106 READY/BUSY CIRCUIT
107 VOLTAGE GENERATION CIRCUIT
108
109 ROW DECODER
110 SENSE AMPLIFIER
111 DATA REGISTER
112 COLUMN DECODER
130 USER AREA
131 SYSTEM AREA

STS
DAT
ADD
CMD
CA
RA
DQ
CONTROL SIGNAL
R/Bn

FIG. 6

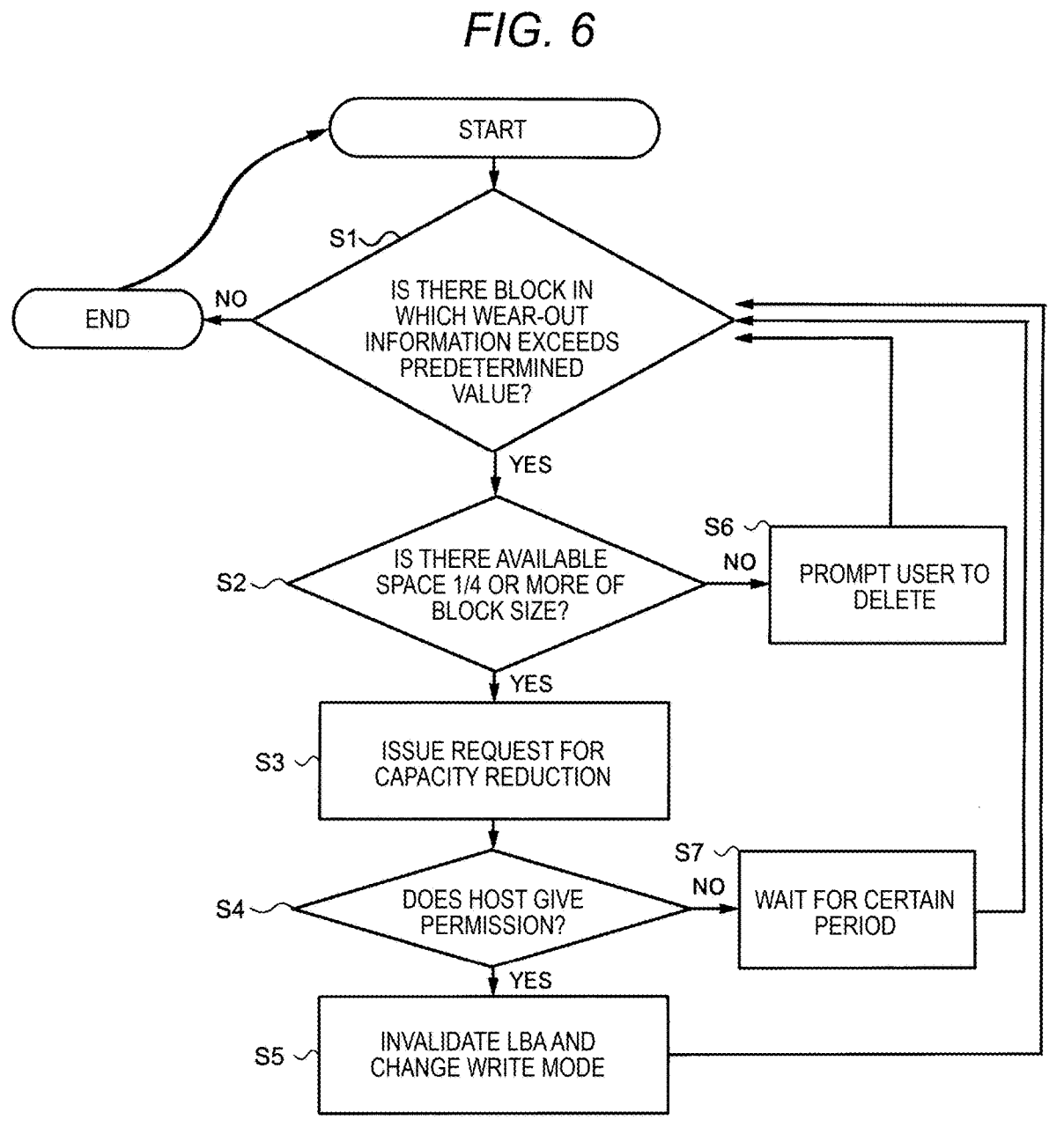

START
S1 IS THERE BLOCK IN WHICH WEAR-OUT INFORMATION EXCEEDS PREDETERMINED VALUE?
NO
END
YES
S2 IS THERE AVAILABLE SPACE 1/4 OR MORE OF BLOCK SIZE?
NO
S6 PROMPT USER TO DELETE
YES
S3 ISSUE REQUEST FOR CAPACITY REDUCTION
S4 DOES HOST GIVE PERMISSION?
NO
S7 WAIT FOR CERTAIN PERIOD
YES
S5 INVALIDATE LBA AND CHANGE WRITE MODE

FIG. 8

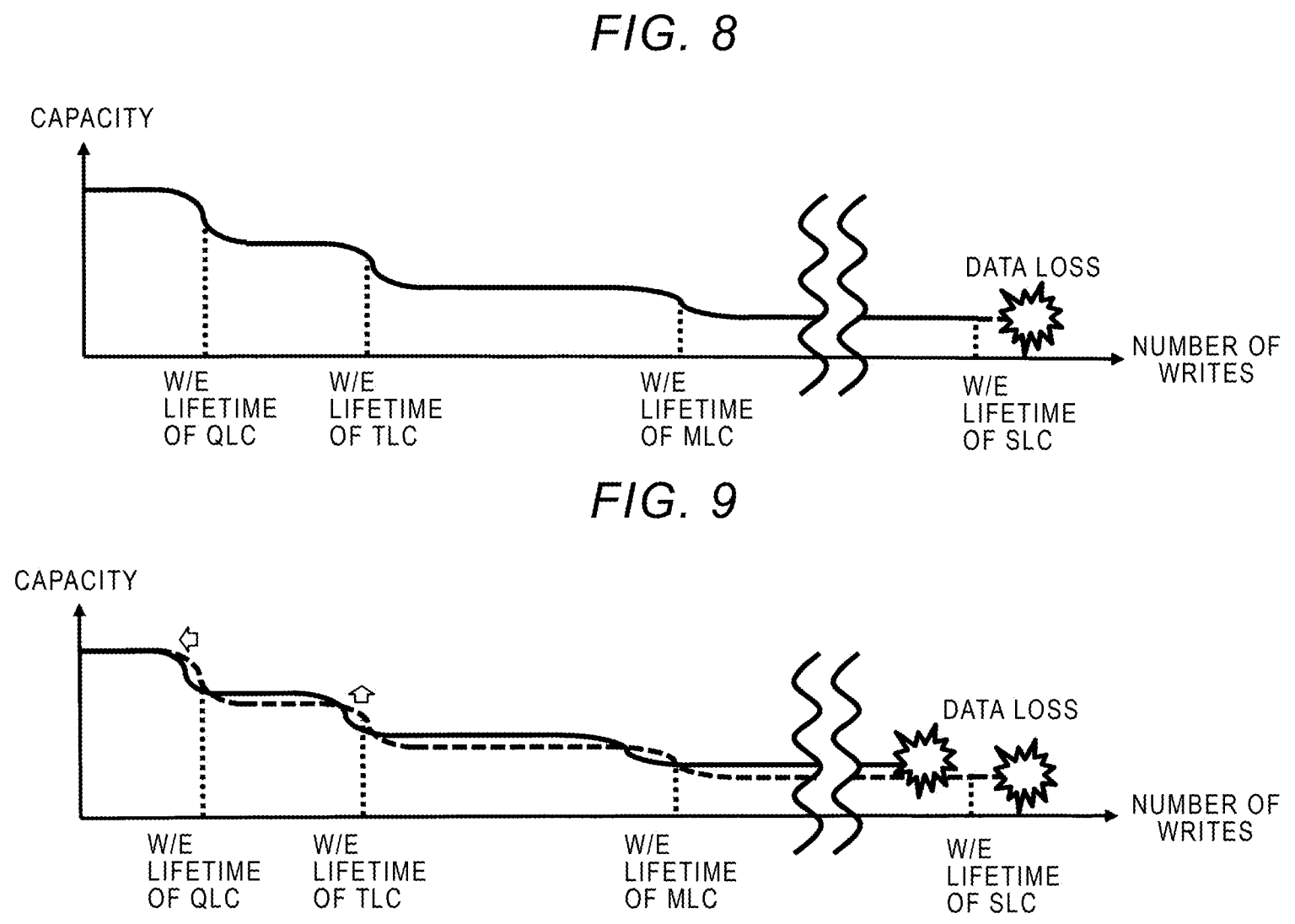

CAPACITY
NUMBER OF WRITES
DATA LOSS
W/E LIFETIME OF QLC
W/E LIFETIME OF TLC
W/E LIFETIME OF MLC
W/E LIFETIME OF SLC

FIG. 9

CAPACITY
NUMBER OF WRITES
DATA LOSS
W/E LIFETIME OF QLC
W/E LIFETIME OF TLC
W/E LIFETIME OF MLC
W/E LIFETIME OF SLC

MEMORY SYSTEM

CROSS-REFERENCE TO RELATED APPLICATION

This application is based upon and claims the benefit of priority from Japanese Patent Application No. 2024-162483, filed Sep. 19, 2024, the entire contents of which are incorporated herein by reference.

FIELD

Embodiments described herein relate generally to a memory system.

BACKGROUND

In recent years, a memory system including a nonvolatile memory is widely used. In the memory system, for example, a NAND type flash memory is used as the nonvolatile memory. In such a memory system, a multi-value technique that realizes large capacity of data storage is introduced.

BRIEF DESCRIPTION OF THE DRAWINGS

FIG. 2 is a block diagram illustrating a configuration of a memory provided in the memory system according to the first embodiment;

FIG. 6 is a flowchart illustrating check of wear-out information and write mode change processing of the information processing system according to the first embodiment;

FIG. 8 is a diagram illustrating a relationship between a capacity of the memory cell array according to the embodiment and thresholds (W/E lifetime) of the number of writes and the number of erasures of the block; and FIG. 9 is a diagram illustrating a relationship between the capacity of the memory cell array according to a second embodiment and the thresholds (W/E lifetime) of the number of writes and the number of erasures of the block.

DETAILED DESCRIPTION

Figure 1:
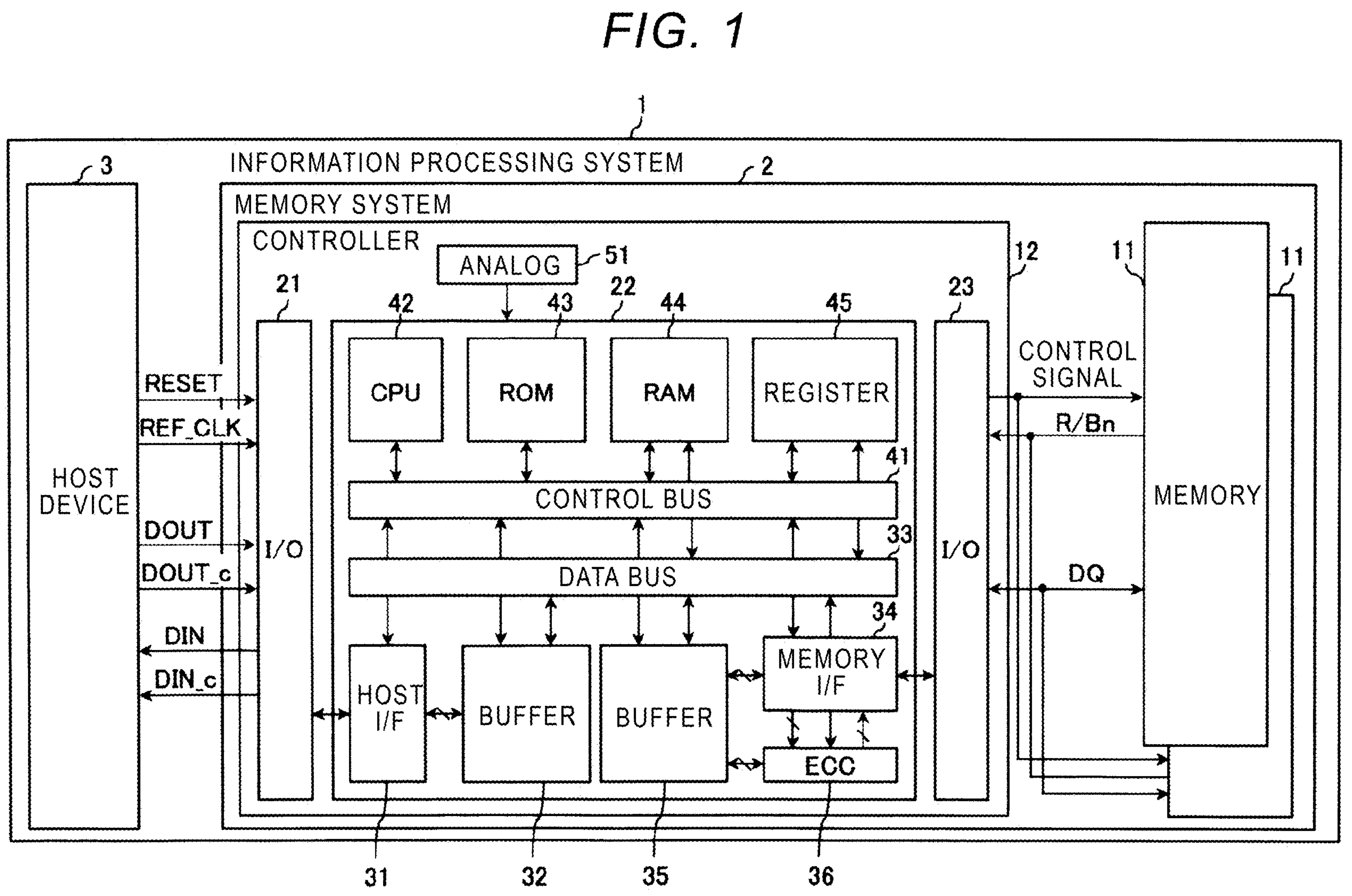
FIG. 1 is a block diagram illustrating a configuration of an information processing system including a memory system according to a first embodiment.

Embodiments provide a memory system capable of storing data over a long period.

In general, according to an embodiment, a memory system comprises a nonvolatile memory including a plurality of blocks, each of which including a plurality of memory cells, and a memory controller. The memory controller is configured to maintain an address mapping between a logical address range and a physical storage region of the nonvolatile memory, track a wear-out degree of each of the blocks, the wear-out degree being based on at least one of a number of times a write operation has been performed on the block and a number of times an erase operation has been performed on the block, and perform a write operation on a certain block in a first write mode of writing a first number of bit per memory cell. The memory controller is configured to, determine, when the wear-out degree of the certain block exceeds a first threshold corresponding to the first write mode, whether the nonvolatile memory has a first predetermined size of free space corresponding to the first write mode, and when determining that the nonvolatile memory has the first predetermined size of free space, invalidate the address mapping for a first part of the logical address range and switch a write mode for the certain block from the first write mode to a second write mode of writing a second number of bit per memory cell, the second number being less than the first number.

Hereinafter, an information processing system including a memory system according to each embodiment will be described with reference to the drawings. In the following description, elements having the same or similar functions and configurations are represented by common reference numerals. When there is a need for distinguishing a plurality of elements having a common reference numeral, subscripts (for example, uppercase alphabetic characters, numbers, and hyphens, uppercase alphabetic characters, and numbers) may be added to the common reference numeral to distinguish the plurality of elements, and redundant description may not be repeated.

First Embodiment

1-1. Overall Configuration of Memory System

An overall configuration of an information processing system 1 including a memory system according to a first embodiment will be described with reference to FIG. 1. FIG. 1 is a block diagram illustrating the configuration of the information processing system 1. The information processing system 1 includes a memory system 2 and a host device 3. The memory system is also referred to as a storage device or a memory card.

The memory system 2 is configured to communicate with the host device 3 based on a client-server model. The memory system 2 operates as a target, and the host device 3 operates as an initiator. As a specific example, the memory system 2 is a Universal Flash Storage (UFS) storage device, and the host device 3 is a host device that supports the UFS storage device. The host device 3 is, for example, a system on chip (SoC) device, and may be a device mounted on a smartphone, a digital camera, or the like.

The memory system 2 includes a plurality of nonvolatile semiconductor memories 11 (hereinafter, denoted as "memories"), and a controller 12 that controls the memories 11. The controller 12 controls each of the plurality of memories 11.

The memory 11 performs a write operation and a read operation of data in a specific unit (may be referred to as write unit) including a plurality of bits. The memory 11 performs an erase operation of data in an erase unit including a plurality of write units. For example, the memory 11 includes one or a plurality of NAND type flash memories. Each NAND type flash memory includes a plurality of blocks, and each block includes a plurality of pages. When the memory 11 is a NAND type flash memory, the memory 11 performs a write operation and a read operation in units of a page, and executes an erase operation in units of a block.

When a write mode of a memory cell is a single-level cell (SLC), one page is configured with a plurality of memory cells connected to one word line. When the write mode of the memory cell is a multi-level cell (MLC), two pages (two bits ($2^2$, four values)) are configured with the plurality of memory cells connected to the one word line, when the write mode of the memory cell is a triple-level cell (TLC), three pages (three bits ($2^3$, eight values)) are configured with the plurality of memory cells connected to the one word line, and when the write mode of the memory cell is a quad-level cell (QLC), four pages (four bits ($2^4$, 16 values)) are configured with the plurality of memory cells connected to the one word line. When the memory cell is a multi-bit cell, one memory cell is set to a multi-bit threshold voltage to correspond to a plurality of pages.

A capacity of the memory cell depends on the write mode (the number of bits) of the memory cell. The capacity of the memory cell is greater as the memory cell stores more bits. The capacity of the memory cell is greater for MLC than that for SLC, is greater for TLC than that for MLC, and is greater for QLC than that for TLC. The write mode of the memory cell is set in units of a block. The write mode of each block is set to any of SLC, MLC, TLC, and QLC.

A durability of the memory 11 to the read operations and the write operations has limits. Accordingly, when the read operation and the write operation are executed on a certain memory cell a predetermined number of times, electrical characteristics of the memory cell are deteriorated. When the electrical characteristics of the memory cell are deteriorated, the memory cell tends to lose a function of storing data. In the embodiment described below, the deterioration of the electrical characteristics of the memory cell in the memory 11 is referred to as "wear-out". A degree of wear-out (a degree of deterioration of the electrical characteristics) is referred to as "wear-out degree". The deterioration of the electrical characteristics of the memory cell depends on, for example, the number of executions of operations such as the write operation or the read operation on the memory cell. Accordingly, here, the number of executions of such operations is referred to as "wear-out information". In the embodiment described below, since the write operation and the read operation are executed in units of a page, the terms of wear-out, wear-out degree, and wear-out information are used for pages.

The definition of "wear-out information" is different depending on the type of the nonvolatile memory. For example, when a nonvolatile memory that wears out at the same level due to both the write operation and the read operation is used, the number of executions of the write operation and the read operation for a target page can be wear-out information. When a nonvolatile memory that is likely to wear out due to the write operation rather than the read operation is used, a value obtained by placing weight on the number of executions of the write operation than the number of executions of the read operation for the target page can be wear-out information. When a nonvolatile memory that is likely to wear out due to the read operation rather than the write operation is used, a value obtained by placing weight on the number of executions of the read operation than the number of executions of the write operation for the target page can be wear-out information. When a nonvolatile memory that wears out due to an erase operation in addition to the write operation and the read operation is used, the number of executions of the erase operation for the target page in addition to the write operation and the read operation described above can be wear-out information.

For example, when the memory cell provided in the target page wears out due to the read operation and the write operation for page(s) adjacent to the target page, the number of executions of the write operation and the read operation for the adjacent page(s) can be wear-out information in addition to the number of executions of the write operation and the read operation for the target page.

In the memory 11, when the wear-out information of the memory cell provided in the target page exceeds a threshold (W/E lifetime), there is a tendency that the memory cell is unable to store data or data stored in the memory cell is lost. Accordingly, it is desirable to track and manage the wear-out information of the memory cell.

The threshold of the wear-out information of the memory cell depends on the write mode (the number of bits) of the memory cell. The threshold of the wear-out information of the memory cell is smaller as the memory cell includes more bits. The threshold of the wear-out information of the memory cell is smaller for MLC than that for SLC, is smaller for TLC than that for MLC, and is smaller for QLC than that for TLC.

Hereinafter, a case where the memory 11 is a three-dimensional stacked NAND type flash memory in which memory cell transistors are three-dimensionally stacked on a semiconductor substrate will be described. The memory is not limited to a three-dimensional stacked NAND type flash memory, and may be a planar NAND type flash memory in which memory cell transistors are two-dimensionally stacked on a semiconductor substrate or may be other nonvolatile memories. Details of the memory 11 will be described below.

The memory system 2 includes an I/O 21, a core logic unit 22, and an I/O 23. The I/O 21 includes a configuration on hardware for connecting the memory system 2 to the host device 3. The memory system 2 is connected to the host device 3 via a host bus. When the information processing system 1 conforms to a Universal Flash Storage (UFS) standard, the host bus corresponds to a serial interface. Signals that are transmitted and received between the memory system 2 and the host device 3 include RESET, REF_CLK, DOUT, DOUT_c, DIN, and DIN_c. RESET, REF_CLK, DOUT, DOUT_c, DIN, and DIN_c are communicated between the host device 3 and the I/O 21 via the host bus. RESET is a hardware reset signal. REF_CLK is a reference clock signal. DOUT and DOUT_c are signals that configure a differential signal pair and are transmitted from the host device 3 to the memory system 2. DIN and DIN_c are signals that configure a differential signal pair and are transmitted from the memory system 2 to the host device 3.

The core logic unit 22 is a main portion excluding the I/O 21 and the I/O 23 in the controller 12. The I/O 23 includes a configuration on hardware for connecting the controller 12 to the memory 11.

The core logic unit 22 includes a host interface 31, a buffer 32, a data bus 33, a memory interface 34, a buffer 35, an error correcting code (ECC) circuit 36, a control bus 41, a central processing unit (CPU) 42, a read only memory (ROM) 43, a random access memory (RAM) 44, and a register 45.

The I/O 21 is connected to the host interface 31. The host interface 31 executes processing required when the memory system 2 and the host device 3 communicate with each other. More specifically, the host interface 31 performs communication between the memory system 2 and the host device 3 according to a communication protocol to which both the memory system 2 and the host device 3 conform. When the memory system 2 is a UFS storage device, for example, the host interface 31 is a UFS interface. The UFS interface conforms to an M-PHY standard for a physical layer, and conforms to a UniPro standard for a link layer.

The host interface 31 is connected to the buffer 32. The buffer 32 receives, via the host interface 31, data transmitted from the host device 3 to the memory system 2 and temporarily stores the received data. The buffer 32 temporarily stores data that is transmitted from the memory system 2 to the host device 3 via the host interface 31. The buffer 32 is connected to the data bus 33.

The I/O 23 is connected to the memory interface 34. The memory interface 34 performs processing required when the controller 12 communicates with the memory 11. More specifically, the memory interface 34 transmits an instruction (control signal) from the core logic unit 22 in a format recognizable by the memory 11. The memory interface 34 transmits and receives a signal DQ to and from the memory 11, and receives a ready/busy signal R/Bn from the memory 11. The signal DQ includes, for example, data, an address, and a command. The signal R/Bn is a signal indicating that the memory 11 is in a busy state. When the memory 11 is a NAND type flash memory, the memory interface 34 is a NAND flash interface.

The memory interface 34 is connected to the buffer 35. The buffer 35 receives, via the memory interface 34, data transmitted from the memory 11 to the controller 12 and temporarily stores the received data. The buffer 35 temporarily stores data that is scheduled to be transmitted from the controller 12 to the memory 11 via the memory interface 34. The buffer 35 is connected to the data bus 33. The buffers 32 and 35 may be a single buffer. The memory interface 34 and the buffer 35 are connected to the ECC circuit 36. The ECC circuit 36 receives data to be written (hereinafter referred to as "write data") from the host device 3 via the data bus 33, adds an error correcting code (hereinafter, referred to as a "parity") to the write data, and supplies the write data with the parity to the buffer 35. The ECC circuit 36 receives, via the buffer 35, data supplied from the memory 11, performs error correction using the parity added to the received data, and supplies error-corrected data to the data bus 33.

The CPU 42, the ROM 43, the RAM 44, and the register 45 are connected to the control bus 41. The CPU 42, the ROM 43, the RAM 44, and the register 45 communicate with one another via the control bus 41.

The CPU 42 controls an overall operation of the memory system 2. The CPU 42 executes predetermined processing (e.g., write operation, read operation, erase operation, or the like) according to a control program (instruction) stored in the ROM 43. The CPU 42 executes, for example, predetermined processing for the memory 11 according to a command received from the host device 3.

When the CPU 42 receives a read request (instruction) including a command and a logical address from the host device 3, the CPU 42 reads logical-to-physical address conversion data (may be referred to as "address mapping") corresponding to the logical address of data to be read from an address conversion table (look-up table LUT), that is maintained in the memory 11 and in which a logical address and a physical address are associated with each other, and converts the logical address into a physical address. The physical address specifies a certain portion of a memory space of the memory 11. The CPU 42 instructs the memory I/F 34 to perform a read operation for reading data to be read from the physical address. When the CPU 42 receives a write request including a command, write data, and a logical address from the host device 3, the CPU 42 newly allocates a physical address corresponding to the logical address to manage the look-up table LUT. The CPU 42 instructs the memory I/F 34 to perform a write operation for writing the write data in the physical address.

The CPU 42 executes garbage collection (GC) (compaction) processing. Garbage collection (GC) is processing for increasing usable blocks among physical blocks, and refers to, for example, processing of collecting valid data from a plurality of active blocks in which valid data and invalid data are included, rewriting valid data in another block, and allocating a free block. Here, an active block indicates a physical block in which valid data is stored. A free block indicates a physical block in which no valid data is stored. A free block can be reused after erasure as an erased block. Free blocks include both of a block before erasure in which no valid data is stored and the erased block. Valid data is data correlated with a logical address described below, and invalid data is data not correlated with any logical address. An erased block becomes an active block when data is written therein. For example, the CPU 42 counts the number of free blocks, and executes GC when the number of free blocks is equal to or less than a predetermined threshold. When the number of free blocks is greater than the predetermined threshold, the CPU 42 may not execute the GC processing.

The CPU 42 acquires, from the memory 11, a physical address of the memory 11 and wear-out information corresponding to a page at the physical address and manages (may be referred to as "tracks") the physical address and the wear-out information. For example, in the present embodiment, the CPU 42 manages (tracks) the number of executions of a write operation (hereinafter, referred to as "the number of writes") for a page at a predetermined physical address. The CPU 42 stores the number of writes corresponding to a specific page in the RAM 44 along with a physical address of the page. That is, the RAM 44 has a function as a counter in which wear-out information of a page is stored. The CPU 42 manages the number of writes by updating a wear-out counter in response to execution of the write operation. In other words, the CPU 42 updates the wear-out counter based on the wear-out information. The wear-out counter indicates a physical address of a page and the number of writes corresponding to the page in association with each other.

The ROM 43 stores a control program and the like that are executed by the CPU 42. The programs and the like stored in the ROM 43 are read and executed by the CPU 42 as needed.

The RAM 44 is used as a work area of the CPU 42 and temporarily stores variables (e.g., write data, read data, and the like) required for operations of the CPU 42. The RAM 44 may be provided with a storage area for various values (for example, "the number of writes") or various tables (for example, the look-up table LUT and the like) that are used during processing. The RAM 44 may be provided outside the controller 12.

The register 45 stores various values required for operations of the memory system 2. The register 45 stores various values required when the host device 3 controls the memory system 2.

The host interface 31, the buffer 32, the memory interface 34, and the buffer 35 are further connected to the control bus 41. The CPU 42 controls the host interface 31, the buffer 32, the memory interface 34, and the buffer 35 based on a control program or an instruction from the host device 3. The controller 12 may be provided with, for example, an analog circuit 51 that functions as a voltage regulator for supplying stabilized voltage.

1-2. Configuration of Memory

A configuration of the memory 11 will be described with reference to FIG. 2. FIG. 2 is a block diagram illustrating the configuration of the memory 11 in the memory system according to the present embodiment. In FIG. 2, while a part of connections between blocks are indicated by arrows, connections between blocks are not limited to the arrows illustrated in FIG. 2.

As illustrated in FIG. 2, the memory 11 includes an input/output circuit 100, a logic control circuit 101, a status register 102, an address register 103, a command register 104, a sequencer 105, a ready/busy circuit 106, a voltage generation circuit 107, a memory cell array 108, a row decoder 109, a sense amplifier 110, a data register 111, and a column decoder 112.

The input/output circuit 100 controls input and output of the signal DQ to and from the controller 12. More specifically, the input/output circuit 100 transmits data DAT (e.g., write data) received from the controller 12 to the data register 111, transmits an address ADD to the address register 103, and transmits a command CMD to the command register 104. The input/output circuit 100 transmits status information STS received from the status register 102, data DAT (e.g., read data) received from the data register 111, and an address ADD received from the address register 103 to the controller 12.

The logic control circuit 101 receives various control signals from the controller 12. The logic control circuit 101 controls the input/output circuit 100 and the sequencer 105 according to the received control signals.

The status register 102 temporarily stores, for example, status information STS regarding a write operation, a read operation, and an erase operation and notifies the controller 12 whether an operation normally ends.

The address register 103 temporarily stores the address ADD received from the controller 12 via the input/output circuit 100. Then, the address register 103 transfers a row address RA to the row decoder 109 and transfers a column address CA to the column decoder 112.

The command register 104 temporarily stores the command CMD received from the controller 12 via the input/output circuit 100 and transfers the command CMD to the sequencer 105.

The sequencer 105 controls operation of the entire memory 11. More specifically, the sequencer 105 controls, for example, the status register 102, the ready/busy circuit 106, the voltage generation circuit 107, the row decoder 109, the sense amplifier 110, the data register 111, and the column decoder 112 according to the command CMD stored in the command register 104 and executes the write operation, the read operation, the erase operation, and the like.

The ready/busy circuit 106 transmits the ready/busy signal R/Bn to the controller 12 according to an operation state of the sequencer 105.

The voltage generation circuit 107 generates voltages required for the write operation, the read operation, and the erase operation under control of the sequencer 105 and supplies the generated voltages to, for example, the memory cell array 108, the row decoder 109, and the sense amplifier 110. The row decoder 109 and the sense amplifier 110 apply the voltages supplied from the voltage generation circuit 107 to the memory cell transistors in the memory cell array 108.

The memory cell array 108 includes a plurality of non-volatile memory cell transistors (hereinafter, also denoted as "memory cells") correlated with rows and columns. The memory cell array 108 includes a user area 130 and a system area 131 as a space area of the memory.

The user area 130 is an area where write data designated by a write command received from the host device 3 (hereinafter, referred to as "user data") is stored. It is preferable that the user area 130 is allocated in a range out of ¼ from a head of logical addresses.

The system area 131 is, for example, an area where information for managing the memory system 2 (hereinafter, referred to as "system data") such as the control program and logical-to-physical address conversion data in the memory 11, or various set parameters such as an applied voltage in the write operation are stored. The system area 131 is an area where the host device 3 cannot access in a write operation and a read operation of data received from the host device 3. It is preferable that the system area 131 is allocated in a range of ¼ or less from the head of the logical addresses.

The row decoder 109 decodes the row address RA. The row decoder 109 applies a predetermined voltage to the memory cell array 108 based on the decoding result.

The sense amplifier 110 performs sensing on data read from the memory cell array 108 in the read operation. Then, the sense amplifier 110 outputs the read data to the data register 111. The sense amplifier 110 writes write data in the memory cell array 108 in the write operation.

The data register 111 includes a plurality of latch circuits. The latch circuit temporarily stores write data or read data. For example, in the write operation, the data register 111 temporarily stores write data received from the input/output circuit 100 and transmits the write data to the sense amplifier 110. For example, in the read operation, the data register 111 temporarily stores read data received from the sense amplifier 110 and transmits the read data to the input/output circuit 100.

The column decoder 112 decodes the column address CA in the write operation, the read operation, and the erase operation, for example, and selects a latch circuit in the data register 111 according to the decoding result.

1-3. Configuration of Memory Cell Array

Figure 3:
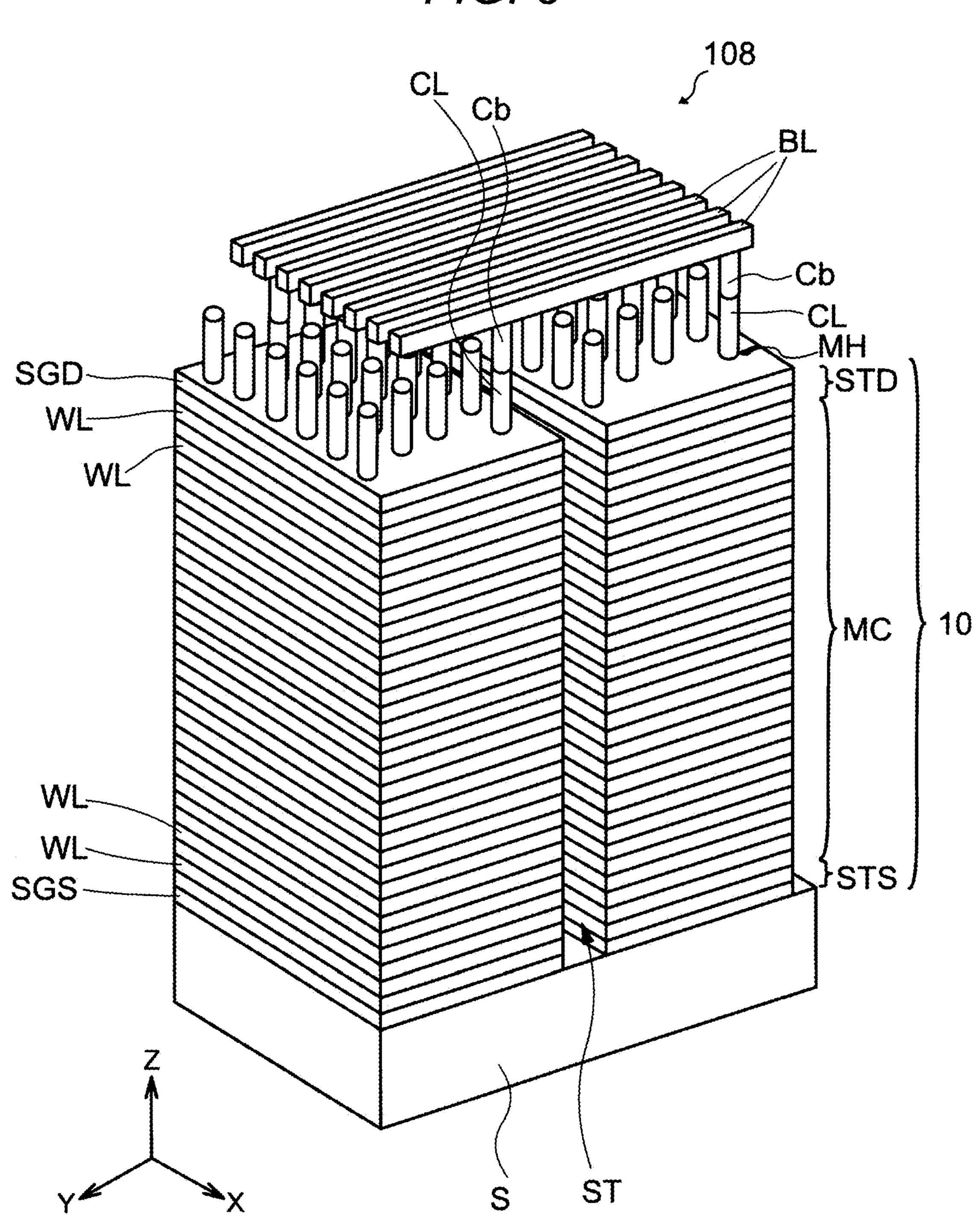
FIG. 3 is a perspective view diagram illustrating a configuration of a memory cell array according to the first embodiment.

A configuration of the memory cell array 108 will be described with reference to FIG. 3. FIG. 3 is a schematic perspective view diagram illustrating arrangement of each element of the memory cell array 108 according to the present embodiment.

In FIG. 3, two directions that are directions parallel to a main surface of a substrate S and are perpendicular to each other are referred to as an X direction and a Y direction, and a plane parallel to the main surface of the substrate S is referred to as an XY plane. A direction perpendicular to both the X direction and the Y direction is referred to as a Z direction (stacking direction).

As illustrated in FIG. 3, the memory cell array 108 includes the substrate S, a stacked body 10 provided on the substrate S, a plurality of columnar body portions CL, and a plurality of bit lines BL provided on the stacked body 10.

In the stacked body 10, a plurality of conductive layers insulated from each other and periodically stacked in a direction perpendicular to the main surface of the substrate S (stacking direction) are formed, in which the conductive layers correspond to a select gate line SGS, a plurality of word lines WL, and a select gate line SGD from the substrate side. In the stacked body 10, openings ST and MH are formed. The openings ST and MH extend in the stacking direction (Z direction), pass through the stacked body 10, and reach the substrate S. The opening ST extends in the X direction and divides the stacked body 10 into a plurality of blocks in the Y direction. The columnar body portion CL is formed in the opening MH (see FIG. 4).

The columnar body portion CL is formed in a columnar shape extending in the stacked body 10 in the stacking direction. The plurality of columnar body portions CL are arranged in a staggered arrangement, for example. Alternatively, the plurality of columnar body portions CL may be arranged in a square lattice arrangement along the X direction and the Y direction.

The plurality of bit lines BL are separated from one another in the X direction, and each bit line BL extends in the Y direction.

An upper end of a semiconductor layer 20 (see FIG. 4) described below of the columnar body portion CL is connected to the bit line BL via a contact portion Cb. A plurality of columnar body portions CL selected one by one from the blocks separated in the Y direction by the opening ST are connected to one common bit line BL.

An insulating layer is formed between a word line WL and a word line WL adjacent to each other in the stacking direction. An insulating layer is formed in the opening ST, and an insulating layer is formed on the stacked body 10. However, for convenience, the insulating layers are not illustrated in FIG. 3.

Figure 4:
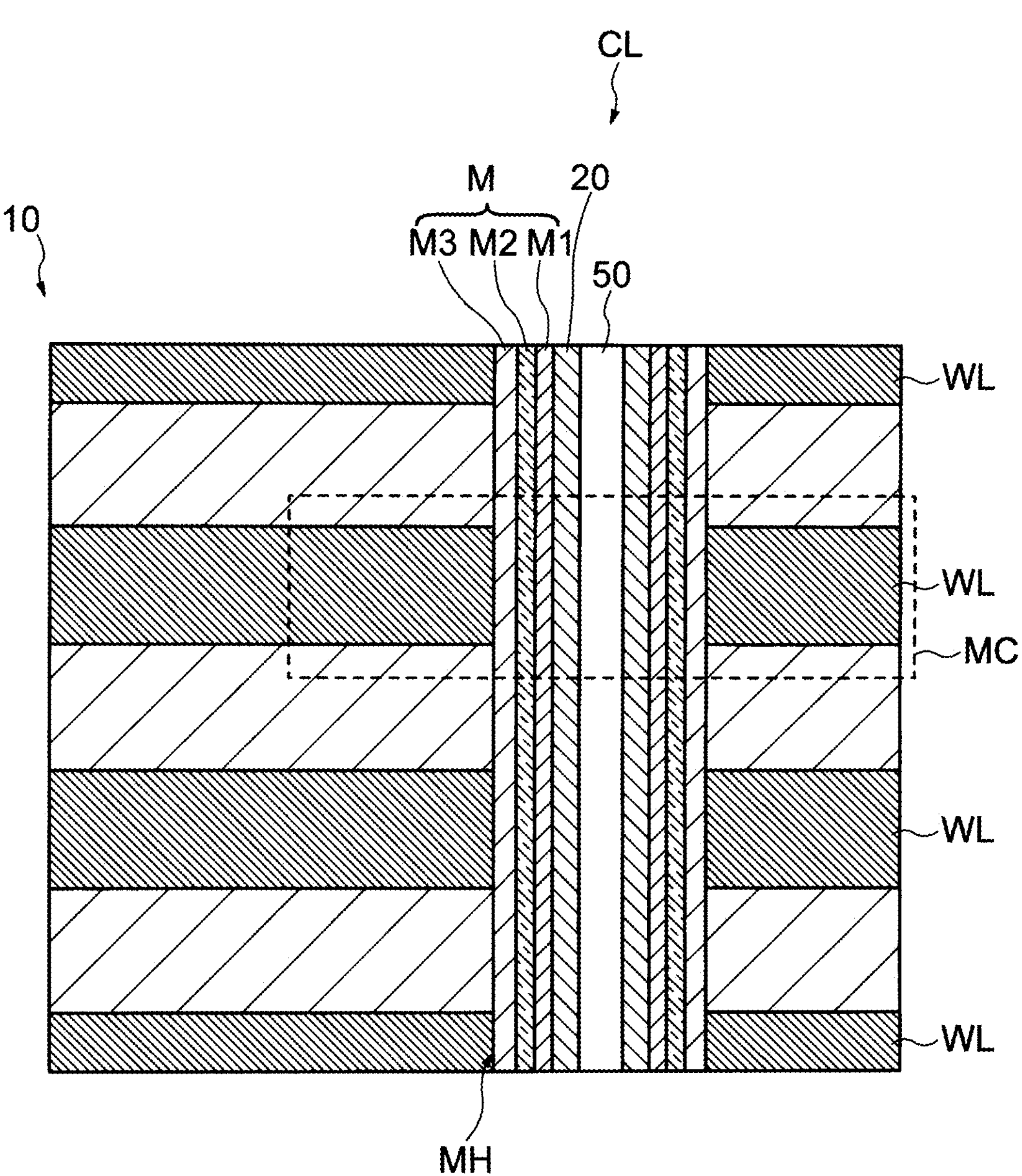
FIG. 4 is a cross-sectional view diagram illustrating a configuration of a memory cell according to the first embodiment.

FIG. 4 is a cross-sectional view diagram illustrating a configuration of the memory cell according to the present embodiment. FIG. 4 illustrates an enlarged cross-sectional view of the columnar body portion CL in FIG. 3.

As illustrated in FIG. 4, the columnar body portion CL is a structure including a memory layer M, a semiconductor layer 20, and an insulating core layer 50. The semiconductor layer 20 continuously extends in the stacked body 10 in the stacking direction (i.e., Z direction). A material of the semiconductor layer 20 includes, for example, amorphous or polycrystalline silicon. The core layer 50 is provided inside the cylindrical semiconductor layer 20. A material of the core layer 50 includes, for example, silicon oxide. The memory layer M is provided between the word line WL and the semiconductor layer 20. The memory layer M surrounds the semiconductor layer 20 from an outer peripheral side of the semiconductor layer 20.

The memory layer M includes a tunnel insulating layer M1, a charge storage layer M2, and a block insulating layer M3 (here, the tunnel insulating layer M1, the charge storage layer M2, and the block insulating layer M3 are referred to as the memory layer M when there is no need for distinguishing each layer). The block insulating layer M3, the charge storage layer M2, and the tunnel insulating layer M1 continuously extend in the stacking direction of the stacked body 10 along with the semiconductor layer 20. The block insulating layer M3, the charge storage layer M2, and the tunnel insulating layer M1 are provided between the word line WL and the semiconductor layer 20 in order from the word line WL side. The tunnel insulating layer M1 is in contact with the semiconductor layer 20. The block insulating layer M3 is in contact with the word line WL. The charge storage layer M2 is provided between the block insulating layer M3 and the tunnel insulating layer M1.

Figure 5:
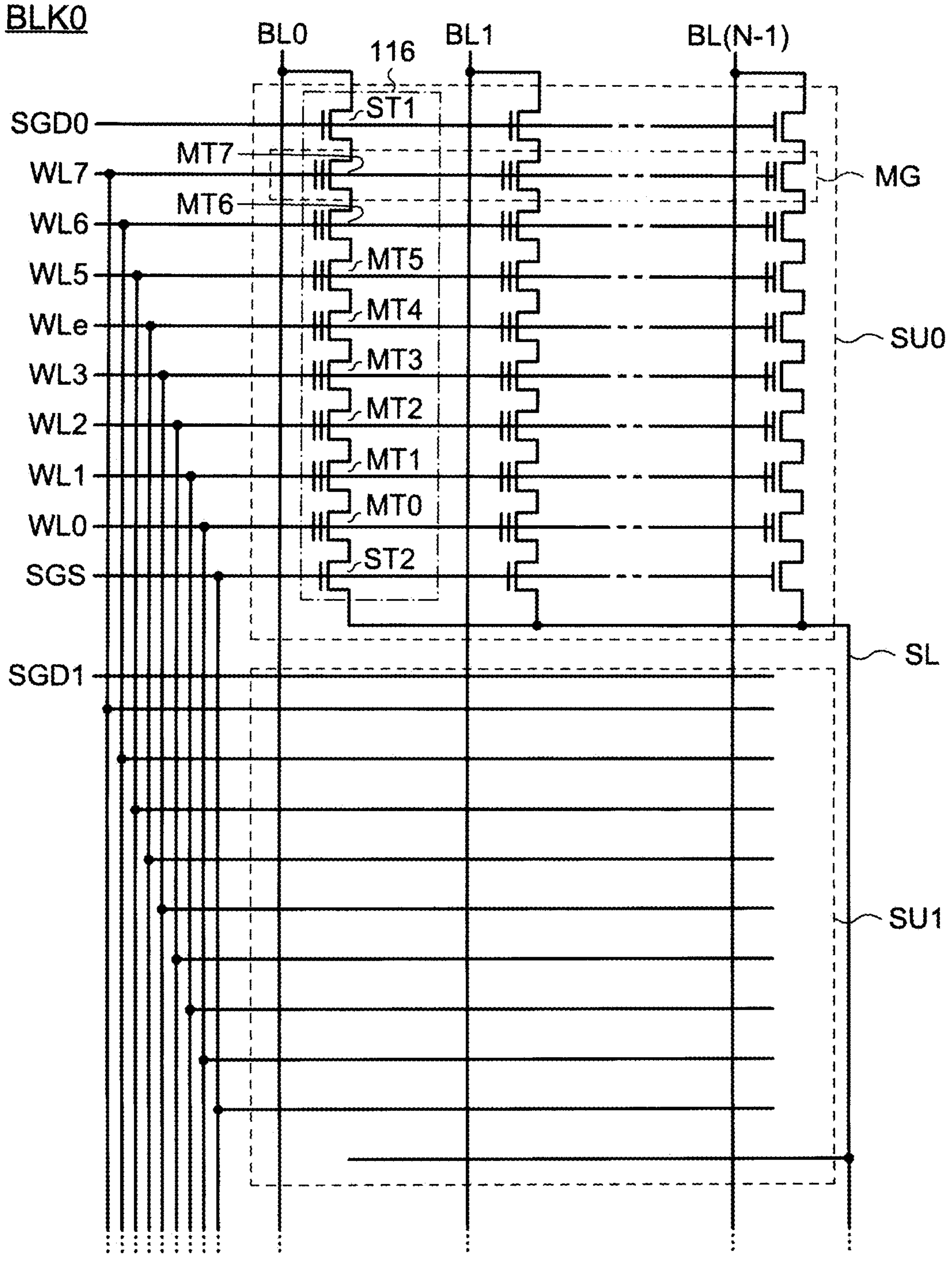
FIG. 5 is a circuit diagram illustrating a configuration of the memory cell array according to the first embodiment.

The semiconductor layer 20, the memory layer M, and the word line WL configure a memory cell MC. In FIG. 5, one memory cell MC is schematically indicated by a broken line. The memory cell MC has a vertical transistor structure in which the word line WL surrounds vicinity of the semiconductor layer 20 with the memory layer M interposed therebetween.

In the memory cell MC having the vertical transistor structure, the semiconductor layer 20 functions as a channel, and the word line WL functions as a control gate of the memory cell. The charge storage layer M2 functions as a data layer that stores charge injected from the semiconductor layer 20.

As described above, a plurality of memory cells MC are arranged in the stacking direction of the plurality of word lines WL, and the plurality of word lines WL are connected to the plurality of memory cells MC, respectively. The word line WL near the block insulating layer M3 functions as a control gate. It is possible to control writing or erasing in the memory cell MC by controlling a voltage to the word line WL connected to the memory cell MC.

The memory cell MC is, for example, a charge trap type memory cell. The charge storage layer M2 includes a plurality of trap sites for trapping charge in the insulating layer. A material of the charge storage layer M2 includes, for example, silicon nitride.

The tunnel insulating layer M1 becomes a potential barrier when charge is injected from the semiconductor layer 20 to the charge storage layer M2 or when charge stored in the charge storage layer M2 diffuses to the semiconductor layer 20. A material of the tunnel insulating layer M1 includes, for example, silicon oxide.

The block insulating layer M3 prevents charge stored in the charge storage layer M2 from diffusing to the word line WL. A material of the block insulating layer M3 includes, for example, silicon oxide.

FIG. 5 is a circuit diagram of a block BLK in the memory cell array 108 of the memory 11. While a block BLK0 will be described as an example, other blocks BLK1, BLK2, . . . have the same circuit. The circuit diagram illustrated in FIG. 5 is merely an example, and is not intended to limit a circuit diagram of the memory cell array 108 according to the first embodiment. In the description of the memory cell array 108, the description of the same or similar configurations as those in FIGS. 1 to 4 may not be repeated.

The block BLK0 includes N bit lines BL (BL0, BL1, . . . , and BL (N−1) (N is an integer equal to or greater than 2)) arranged in columns, a plurality of NAND strings 116 arranged in rows and columns, and a source line SL. The NAND strings 116 are connected between the N bit lines BL and the source line SL. Each of the NAND strings 116 includes, for example, eight memory cell transistors MT (MT0 to MT7) and select transistors ST1 and ST2. Each of the memory cell transistors MT includes a control gate and a charge storage layer, and stores data in a nonvolatile manner. The memory cell transistor MT is connected in series between a source of the select transistor ST1 and a drain of the select transistor ST2. The NAND strings 116 are provided for the N bit lines BL to configure string units SU (SU0, SU1). While the NAND string 116 includes, for example, eight memory cell transistors MT in FIG. 5, the number of memory cell transistors MT in the NAND string 116 is not limited to eight. For example, the number of memory cell transistors MT may be i, and the integer i may be greater or smaller than 8.

The select transistor ST1 is connected to a select gate line SGD0. A gate of the select transistor ST1 in each of the string units SU is connected to the select gate line SGD (SGD0, SGD1, . . . ; a plurality of SGD0, SGD1, . . . are referred to as the select gate line SGD when there is no need for distinguishing each select gate line). Gates of the eight memory cell transistors MT (MT0 to MT7) are connected to the corresponding word lines WL (WL0 to WL7), respectively. A gate of the select transistor ST2 in each of the string units SU is connected to the select gate line SGS. The gates of the select transistors ST1 each connected to separate bit lines BL in the same string unit SU is connected to the same select gate line SGD. The gates of the memory cell transistors MT (MT0 to MT7) in the same string unit SU are connected to the common word lines WL (WL0 to WL7).

The gates of a plurality of select transistors ST2 in the same block BLK are connected to the same select gate line SGS. The source line SL is shared among a plurality of blocks BLK, for example.

The memory cell transistors MT connected to the same word line WL (WL0 to WL7) in the same string unit SU configure a unit of a read operation and a write operation. For example, the memory cell transistors MT7 in the NAND strings 116 provided in the string unit SU corresponding to the select gate line SGD0 configure a memory cell group MG as the unit of the read operation and the write operation, and the read operation and the write operation are collectively executed for the memory cell group MG.

1-4. Wear Leveling Processing

While the controller 12 executes the write operation and the erase operation in the memory 11 according to a write request and an erase request from the host device 3, respectively, the write operation and the erase operation may be concentratedly repeated for a part of pages. The memory 11 may wear out when the write operation and the erase operation are concentratedly repeated for a specific page and may lose a function as a memory cell.

To avoid such a problem, the controller 12 performs wear leveling processing. The wear leveling processing is, for example, processing of rewriting data stored in a block of a nonvolatile memory for which the number of writes of data is large (movement source block) to a block of the nonvolatile memory for which the number of writes of data is small (movement destination block). By the wear leveling processing, a correspondence relationship between a logical address and a physical address (look-up table LUT) is changed. By the change of the correspondence relationship, even when the write request and the erase request from the host device 3 are executed for a specific logical address multiple times, the write operation and the erase operation are executed for pages with different physical addresses. Therefore, it is possible to prevent concentration of wear-out to memory cells provided in a part of pages.

For example, in the wear leveling processing, at least one of the number of writes and the number of erasures is managed in units of a block, and the correspondence relationship between the logical address and the physical address is changed in units of a block. However, in the wear leveling processing, the correspondence relationship between the logical address and the physical address may be changed in units of a page. In the wear leveling processing, the correspondence relationship between the logical address and the physical address may be changed in units of a plurality of pages. The wear leveling processing may be executed by managing at least one of the number of writes and the number of erasures in units of a block.

By executing the above-described wear leveling processing, a deviation of the wear-out degree of the memory 11 in units of a page or a block is small, and the memory 11 can efficiently use the memory cell to store data until the wear-out information reaches the threshold (W/E lifetime).

1-5. Check of Wear-Out Information and Write Mode Change Processing

In check of wear-out information, first, determination is made whether there is a need to change the write mode, according to a state of the wear-out counter and other types of information regarding wear-out. For example, when the number of writes and the number of erasures for a physical address of a page where the write operation and the erase operation of data are performed are small, determination is made that there is no need to execute the write mode change processing, the write operation is performed without executing the write mode change processing. Meanwhile, when the number of writes and the number of erasures for a physical address of a page where the write operation and the erase operation of data are performed are close to the thresholds (W/E lifetime), the write mode change processing is executed on a block including the page. The write mode change processing is executed based on update processing of the wear-out counter stored in the RAM 44.

Operations of the check of wear-out information and write mode change processing will be described with reference to FIG. 6. FIG. 6 is a flowchart illustrating the check of wear-out information and the write mode change processing of the information processing system according to the present embodiment.

As illustrated in FIG. 6, first, the controller 12 determines whether there is a block including a page of which wear-out information exceeds a predetermined value (Step S1). Here, it is preferable that the predetermined value is smaller than a threshold (W/E lifetime) of wear-out information (at least one of the number of writes and the number of erasures) in the current write mode. By setting the predetermined value to be smaller than the threshold (W/E lifetime) of the wear-out information in the current write mode, it is possible to prevent a situation in which the memory cell is unable to store data or data stored in the memory cell is lost by executing the write mode change processing. The determination may be performed with the wear-out information of each page or may be performed with an average value of the wear-out information of the pages in the block. The controller 12 may manage the wear-out information in units of a block, and in the determination processing, determination may be performed with the wear-out information of the block. When there is a block including a page of which the wear-out information exceeds the predetermined value (in Step S1, YES), the write mode change processing described below is executed, and when there is no block including a page of which the wear-out information exceeds the predetermined value (in Step S1, NO), the process ends.

When there is a block including a page of which the wear-out information exceeds the predetermined value (in Step S1, YES), the controller 12 determines whether there is an available space having a size equal to or larger than a predetermined size of a block size in the memory cell array 108 (Step S2). When there is an available space having a size equal to or larger than the predetermined size of the block size in the memory cell array 108 (in Step S2, YES), the write mode change processing described below is executed. The predetermined size is, specifically, ¼ of the block size when the write mode of the block is QLC, ⅓ of the block size when the write mode of the block is TLC, and ½ of the block size when the write mode of the block is MLC. The predetermined size may be a size slightly greater than ¼ of the block size when the write mode of the block is QLC, the predetermined size may be a size slightly greater than ⅓ of the block size when the write mode of the block is TLC, and the predetermined size may be a size slightly greater than ½ of the block size when the write mode of the block is MLC. Here, the block size is a size of data that can be stored in the memory system 2, and is a size capacity of the memory cell array 108.

When there is no available space having a size equal to or larger than the predetermined size of the block size in the memory cell array 108 (in Step S2, NO), the controller 12 notifies the host device 3 that an available space of the memory cell array 108 is insufficient (Step S6). Specifically, the controller 12 requests the host device 3 to request data deletion to a user of the host device 3. Steps S1 and S2 are repeated at regular intervals until there is a sufficient available space in the memory cell array 108.

When there is an available space having a size equal to or larger than the predetermined size of the block size in the memory cell array 108 (in Step S2, YES), the controller 12 issues a request for capacity reduction to the host device 3 (Step S3). That is, the controller 12 issues a request for reduction of the number of logical addresses. Here, for example, the controller 12 issues a request to invalidate logical addresses corresponding to a predetermined size of the block size from an end of the logical addresses to the host device 3.

When valid data is stored at a logical address to be reduced, the controller 12 issues a request to the host device 3 to move the logical address to another logical address before issuing the request for capacity reduction. The host device 3 transmits a write request and a delete request to the memory system 2 according to the request to move the logical address.

When the host device 3 permits the request for capacity reduction (in Step S4, YES), the controller 12 executes the write mode change processing described below. When the host device 3 does not permit the request for capacity reduction (in Step S4, NO), the controller 12 repeats Steps S1 to S4 at regular intervals (Step S7).

Figure 7:
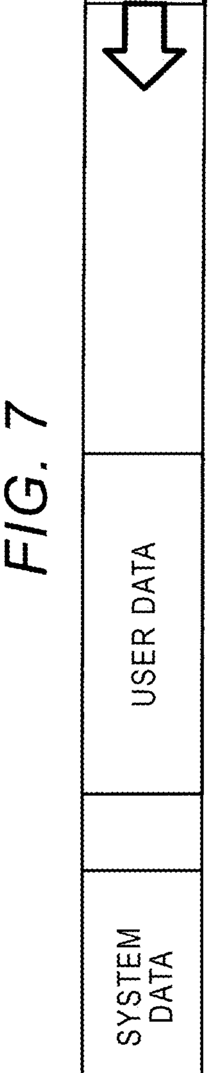
FIG. 7 is a diagram illustrating allocation of logical addresses of the memory cell array according to the first embodiment.

When the host device 3 permits the request for capacity reduction (in Step S4, YES), the controller 12 invalidates logical addresses corresponding to a predetermined size of the block size from the end of the logical addresses. No physical address is allocated to the invalidated logical addresses. FIG. 7 is a diagram illustrating allocation of logical addresses of the memory cell array. In the present embodiment, by invalidating the logical addresses from the end of the logical addresses, it is possible to execute reduction of the capacity of the memory cell array 108 without affecting system data allocated in a range equal to or smaller than a predetermined size from the head of the logical addresses. That is, at the beginning of use of the memory system 2, that is, when the wear-out information does not exceed the predetermined value, in the memory system 2 in which the write mode is QLC, it is possible to execute reduction of the capacity of the memory cell array 108 without affecting system data as long as the system data is allocated in a range equal to or smaller than ¼ from the head of the logical addresses.

After a part of logical addresses is invalidated, the write mode of the block including the page of which the wear-out information exceeds the predetermined value is changed to a mode in which the number of bits is smaller by one (Step S5). Specifically, the write mode is changed to TLC when the write mode of the block is QLC, the write mode is changed to MLC when the write mode of the block is TLC, and the write mode is changed to SLC when the write mode of the block is MLC. In the block where the write mode is changed, a new write mode is applied from a subsequent write operation.

In the present embodiment, by changing the write mode to a mode where the number of bits is smaller by one, while the capacity of the memory cell array 108 is reduced, the thresholds (W/E lifetime) of the number of writes and the number of erasures of the block can be increased.

By repeating Steps S1 to S5 at regular intervals, the memory cell array 108 can store data over a long period until the thresholds (W/E lifetime) of the number of writes and the number of erasures of the SLC are reached.

FIG. 8 is a diagram illustrating a relationship between the capacity of the memory cell array and the thresholds (W/E lifetime) of the number of writes and the number of erasures of the block. In the present embodiment, the number of writes and the number of erasures of the blocks of the memory cell array 108 are substantially leveled by the wear leveling processing. Therefore, when the number of writes and the number of erasures are close to the thresholds (W/E lifetime) in each write mode, the write mode is changed simultaneously in the blocks of the memory cell array 108. As a result, the capacity of the memory cell array 108 is reduced stepwise. However, the present disclosure is not limited thereto, and when the number of writes and the number of erasures are not substantially leveled by the wear leveling processing, the write mode may be changed sequentially in the blocks of the memory cell array 108, and the capacity of the memory cell array 108 may be reduced linearly. In both cases, the thresholds (W/E lifetime) of the number of writes and the number of erasures of the memory cell array 108 are increased, and a total storage capacity is reduced. Finally, the memory cell array 108 can store data over a long period until the thresholds (W/E lifetime) of the number of writes and the number of erasures of the SLC are reached.

In the present embodiment, the write mode change processing is executed in units of a block. However, the present disclosure is not limited thereto, and when the number of writes and the number of erasures of the blocks of the memory cell array 108 are substantially leveled by the wear leveling processing, the write mode change processing may be executed in all blocks when determination is made in Step S1 to be YES. Then, in the blocks where the write mode is changed, the changed write mode is applied from a subsequent write operation.

In the present embodiment, an example where at least one of the number of writes and the number of erasures is used as the wear-out information is described. However, the present disclosure is not limited thereto, and as wear-out information, the number of reads may be used or both the number of writes and the number of reads may be used. When wear-out due to reading has little influence, for example, a threshold of the number of reads may be about ten times the threshold of the number of writes.

Second Embodiment

A structural configuration of a memory system according to a second embodiment is the same as the structural configuration of the memory system according to the first embodiment, and description thereof will not be repeated. In the first embodiment, the wear leveling processing and the write mode change processing are executed equally in all blocks of the memory cell array 108. In the second embodiment, the wear leveling processing and the write mode change processing are executed in a part of blocks of the memory cell array 108.

An information processing system including the memory system according to the second embodiment will be described with reference to FIG. 9. FIG. 9 is a diagram illustrating a relationship between the capacity of the memory cell array and the thresholds (W/E lifetime) of the number of writes and the number of erasures. An example of the first embodiment is indicated by a dotted line, and an example of the second embodiment is indicated by a solid line.

Read-only data is stored in (or is moved from another block to) a block where the number of writes is close to the threshold (W/E lifetime) of the number of writes of an initial write mode (for example, QLC). The initial write mode is maintained in the block, and the wear leveling processing and the write mode change processing are executed only in other blocks. Read-only data may be indicated when the host device 3 requests writing to the memory system 2. For example, it may be designated that write data is read-only data when the host device 3 requests writing to the memory system 2. Read-only data may be, for example, system data.

In the present embodiment, by executing the wear leveling processing and the write mode change processing in only a part of blocks, while a timing of the write mode change processing is earlier, it is possible to minimize a capacity reduction width of the memory cell array 108. As illustrated in FIG. 9, compared to the first embodiment (dotted line), while the timing of capacity reduction of the memory cell array 108 is earlier, it is possible to minimize the capacity reduction width in the second embodiment (solid line).

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:

a nonvolatile memory including a plurality of blocks, each of which including a plurality of memory cells; and a memory controller configured to:

maintain an address mapping between a logical address range and a physical storage region of the nonvolatile memory;

track a wear-out degree of each of the blocks, the wear-out degree being based on at least one of a number of times a write operation has been performed on the block and a number of times an erase operation has been performed on the block;

perform a write operation on a certain block in a first write mode of writing a first number of bit per memory cell;

when the wear-out degree of the certain block exceeds a first threshold corresponding to the first write mode, determine whether the nonvolatile memory has a first predetermined size of free space corresponding to the first write mode; and when determining that the nonvolatile memory has the first predetermined size of free space, invalidate the address mapping for a first part of the logical address range and switch a write mode for the certain block from the first write mode to a second write mode of writing a second number of bit per memory cell, the second number being less than the first number.

2. The memory system according to claim 1, wherein the first predetermined size is a unit data size of the erase operation divided by the first number.

3. The memory system according to claim 1, wherein the second number is less than the first number by one.

4. The memory system according to claim 1, wherein the first part of the logical address range is a last part of a valid logical address range.

5. The memory system according to claim 1, wherein the plurality of blocks including a plurality of pages, each of which including a plurality of memory cells, and the wear-out degree of the certain block is based on at least one of a number of times a write operation has been performed on each of the pages in the certain block and a number of times an erase operation has been performed on each of the pages in the certain block.

6. The memory system according to claim 1, wherein the memory controller is further configured to transmit, to a host device connected to the memory system, a request to permit partial invalidation of the logical address range.

7. The memory system according to claim 6, wherein the memory controller is further configured to invalidate the address mapping for the first part of the logical address range, upon the host returning permission of the partial invalidation of the logical address range in response to the request.

8. The memory system according to claim 1, wherein the memory controller is further configured to transmit, to a host device connected to the memory system, a request for data deletion upon determining that the nonvolatile memory does not have the first predetermined size of free space.

9. The memory system according to claim 1, wherein the memory controller is further configured to:

when the wear-out degree of the certain block exceeds a second threshold corresponding to the second write mode, determine whether the nonvolatile memory has a second predetermined size of free space corresponding to the second write mode, the second threshold being greater than the first threshold, the second predetermined size being greater than the first predetermined size; and when determining that the nonvolatile memory has the second predetermined size of free space, invalidate the address mapping further for a second part of the logical address range and switch the write mode for the certain block from the second write mode to a third write mode of writing a third number of bit per memory cell, the third number being less than the second number.

10. The memory system according to claim 9, wherein the memory controller is further configured to:

when the wear-out degree of the certain block exceeds a third threshold corresponding to the third write mode, determine whether the nonvolatile memory has a third predetermined size of free space corresponding to the third write mode, the third threshold being greater than the second threshold, the third predetermined size being greater than the second predetermined size; and when determining that the nonvolatile memory has the third predetermined size of free space, invalidate the address mapping further for a third part of the logical address range and switch the write mode for the certain block from the third write mode to a fourth write mode of writing a fourth number of bit per memory cell, the fourth number being less than the third number.

11. A memory system comprising:

a nonvolatile memory including a plurality of blocks, each of which including a plurality of memory cells; and a memory controller configured to:

track a wear-out degree of each of the blocks, the wear-out degree being based on at least one of a number of times a write operation has been performed on the block and a number of times an erase operation has been performed on the block;

perform a write operation on a first block among the plurality of blocks in a first write mode of writing a first number of bit per memory cell;

when the wear-out degree of the first block exceeds a first threshold corresponding to the first write mode, switch a write mode for a second block among the plurality of blocks from the first write mode to a second write mode of writing a second number of bit per memory cell, the second number being less than the first number wherein after the wear-out degree of the first block exceeds the first threshold, read-only data is stored in the first block in the first write mode.

12. The memory system according to claim 11, wherein the memory controller is further configured to:

maintain an address mapping between a logical address range and a physical storage region of the nonvolatile memory;

when the wear-out degree of the first block exceeds a first threshold corresponding to the first write mode, invalidate the address mapping for a first part of the logical address range.

13. The memory system according to claim 12, wherein the first part of the logical address range is a last part of a valid logical address range.

14. The memory system according to claim 11, wherein the plurality of blocks including a plurality of pages, each of which including a plurality of memory cells, and the wear-out degree of the certain block is based on at least one of a number of times a write operation has been performed on each of the pages in the certain block and a number of times an erase operation has been performed on each of the pages in the certain block.

15. The memory system according to claim 11, wherein the read-only data comprises system data.

16. The memory system according to claim 11, wherein the memory controller is further configured to perform a write operation in the second write mode on the second block.

17. The memory system according to claim 16, wherein the memory controller is configured to perform the write operation in the second write mode on the second block in response to a write command from a host device connected to the memory system.

18. The memory system according to claim 16, wherein, during the write operation in the second write mode on the second block, valid data stored in a third block among the plurality of blocks and valid data stored in a four block among the plurality of blocks are written into the second block.

19. The memory system according to claim 11, wherein the memory controller is further configured to:

when the wear-out degree of the second block exceeds a second threshold corresponding to the second write mode, the second threshold being greater than the first threshold, invalidate the address mapping further for a second part of the logical address range and switch the write mode for a third block among the plurality of blocks from the second write mode to a third write mode of writing a third number of bit per memory cell, the third number being less than the second number.

20. The memory system according to claim 19, wherein the memory controller is further configured to:

when the wear-out degree of the third block exceeds a third threshold corresponding to the third write mode, the third threshold being greater than the second threshold, invalidate the address mapping further for a third part of the logical address range and switch the write mode for a fourth block among the plurality of blocks from the third write mode to a fourth write mode of writing a fourth number of bit per memory cell, the fourth number being less than the third number.

* * * * *